(No Model.)
F. A. MAGOWAN.
MODE OF UTILIZING DISCARDED RUBBER HOSE.
No. 292,021.            Patented Jan. 15, 1884.
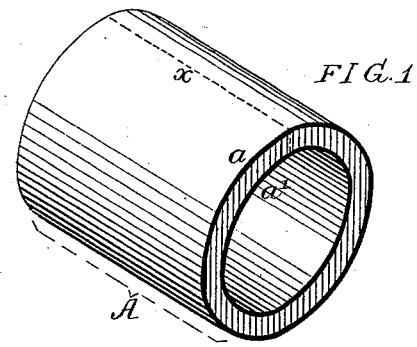
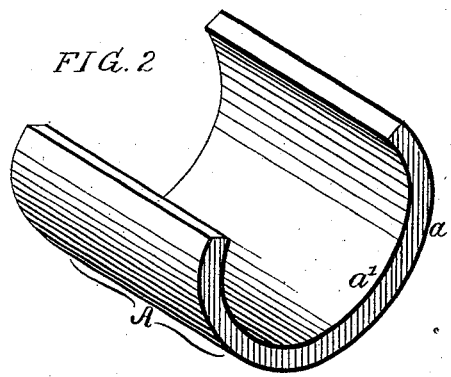
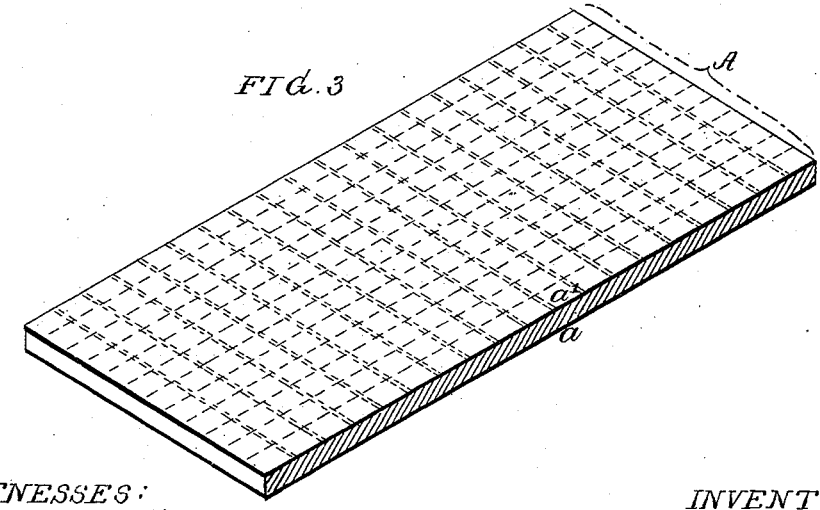
WITNESSES:
James F. Jobin
John M. Clayton.
INVENTOR:
Frank A. Magowan
by his Attorneys
Howson & Sons

UNITED STATES PATENT OFFICE.

FRANK A. MAGOWAN, OF TRENTON, NEW JERSEY.

MODE OF UTILIZING DISCARDED RUBBER HOSE.

SPECIFICATION forming part of Letters Patent No. 292,021, dated January 15, 1884.

Application filed November 22, 1883. (No model.)

*To all whom it may concern:*

Be it known that I, FRANK A. MAGOWAN, a citizen of the United States, residing in Trenton, Mercer county, New Jersey, have invented a Mode of Utilizing Discarded Rubber Hose, of which the following is a specification.

My invention consists of a mode, described hereinafter, of utilizing rubber hose or tubing which is no longer available for the purpose for which it was made, the object of my invention being to convert such tubing into mats for carriage-steps, or into strips or slabs for other useful purposes.

Rubber hose or tubing consists of an outer layer, $a$, and an inner layer, $a'$, of rubber, and an intervening layer or layers, $b$, of cotton duck or other suitable fabric, as shown in the sectional perspective view, Figure 1, of the accompanying drawings.

In carrying out my invention, I cut a discarded hose into sections of any desired length, and sever each section longitudinally on the line $x$; or a discarded hose may be severed longitudinally from end to end and then cut into sections. Each severed section is then folded out, as shown in Fig. 2, until it becomes a flat strip, A, Fig. 3, and this is subjected to pressure between plates and to the process of vulcanizing, the result being a strip or slab which, owing to the said vulcanizing process, will remain in its flat condition. The strip or slab thus formed may be coated with rubber at the edges, and one of the plates or dies between which it is subjected to pressure may be so made as to impart a corrugated or ribbed or other patterned surface to the slab, which is thus rendered available as a mat for the steps of carriages or cars, or for other purposes, the largest rubber hose being converted into larger mats, or into slabs for other purposes.

If desired, one side of the folded-out section of hose may be re-enforced with an additional layer of rubber applied before the process of vulcanizing.

I claim as my invention—

The mode herein described of utilizing discarded rubber hose, the said mode consisting in first folding out severed sections of the hose, and then subjecting the sections to pressure and the process of vulcanizing, substantially as set forth.

In testimony whereof I have signed my name to this specification in the presence of two subscribing witnesses.

F. A. MAGOWAN.

Witnesses:
    JOHN M. CLAYTON,
    HARRY SMITH.